United States Patent [19]
Fertig

[11] 3,770,974
[45] Nov. 6, 1973

[54] NON-DISPERSIVE INFRARED FLUID ANALYZER WITH COMPENSATION FOR ABSORPTIVE AND MECHANICAL EFFECTS OF AMBIENT CONDITIONS

[75] Inventor: Glenn Howard Fertig, Etna, Pa.

[73] Assignee: Mine Safety Appliances Company, Pittsburgh, Pa.

[22] Filed: June 29, 1972

[21] Appl. No.: 267,358

[52] U.S. Cl................. 250/344, 250/341, 250/346
[51] Int. Cl. ........................................... G01n 21/34
[58] Field of Search ................................. 250/43.5

[56] References Cited
UNITED STATES PATENTS

| | | | |
|---|---|---|---|
| 2,924,713 | 2/1960 | Liston | 250/43.5 |
| 3,206,597 | 9/1965 | Fertig et al. | 250/43.5 |
| 2,999,929 | 9/1961 | Martin et al. | 250/43.5 |
| 3,488,491 | 1/1970 | Schuman | 250/43.5 |
| 2,709,751 | 5/1955 | Meyer | 250/43.5 |

Primary Examiner—William F. Lindquist
Attorney—Ronald H. Shakely

[57] ABSTRACT

Alternately chopped analytic and reference beams of infrared energy are passed through sample and reference fluids, respectively, and then sequentially through a first detector, a filter, and a second detector. Each detector is of the variable capacitor type responsive to pressure pulses, producing an output signal that is a function of the difference in the energies absorbed in the two beam paths. The first detector responds to absorption by the sample fluid due both to the component of interest and to an ambient condition (icluding the presence in the sample of an interferent having an absorption band overlapping that of the component in a spectral region where both are weakly absorbent). The second detector responds to absorption by the sample fluid due to the ambient condition alone. The filter limits the absorptive response of the second detector to an amount that will compensate for the similar response of the first detector to said ambient condition. The net output signal of the two detectors is a function of the difference of the individual outputs and responsive to component concentration. The two detectors are physically identical, and the signal output of the second detector may be adjusted to eliminate mechanical effects, such as vibration, due to other ambient conditions, without affecting the absorptive sensitivity of the instrument. A modification of more limited application, using a single beam, is also disclosed.

8 Claims, 4 Drawing Figures

NON-DISPERSIVE INFRARED FLUID ANALYZER WITH COMPENSATION FOR ABSORPTIVE AND MECHANICAL EFFECTS OF AMBIENT CONDITIONS

This invention relates to absorptive and mechanical problems caused by various ambient conditions, as they affect the design and operation of non-dispersive infrared fluid analyzers using pneumatic detectors of the condenser microphone type. Such analyzers are subject to error if the absorption of infrared energy by the sample is affected by changes in ambient conditions, including, for example, (1) the presence in the sample of an interfering fluid having an infrared absorption band overlapping that of the component of interest, or (2) changes in the intensity of the infrared energy source. The instrument is also subject to error if used under conditions in which it is exposed to mechanical vibration or shock, which, although it does not affect the infrared absorption, does affect the mechanical operation of the detector to change its output signal. Many attempts, more or less successful, have been made to reduce the undesirable effects of each of these factors, but none has succeeded in eliminating or satisfactorily reducing both of them in the same instrument.

For example, Liston U.S. Pat. No. 2,924,713 discloses an analyzer for reducing error due to absorptive ambient effects, including the presence in the sample of an interferent having an absorption band overlapping that of the component in a spectral region where both the component and the interferent are relatively strongly absorptive; but there is no adequate compensation for error due to vibration of the pneuamtic detectors. On the other hand, the analyzer of Fertig U.S. Pat. No. 3,206,597 (in which the inventor and the assignee are the same as in the present application) compensates for mechanically induced errors caused by vibration and for absorption induced errors caused by certain ambient conditions, but does not compensate for errors due to cross sensitivity to an interferent.

Accordingly, the present invention is primarily directed to providing an analyzer of the foregoing type (1) that will eliminate or substantially reduce the absorptive effects of certain ambient conditions, including, in one form of the invention, the presence in the sample fluid of an interferent having an infrared absorption band that overlaps that of the component of interest in a spectral region where both the component and the interferent are not strongly absorptive and (2) that will at the same time eliminate or substantially reduce the effects of mechanical vibration and shock.

Further objects of the invention will be apparent from the following description of a preferred embodiment in connection with the attached drawings, in which FIG. 1 represents a diagrammatic view of a non-dispersive double beam infrared analyzer embodying the present invention;

Figures 1, 4:
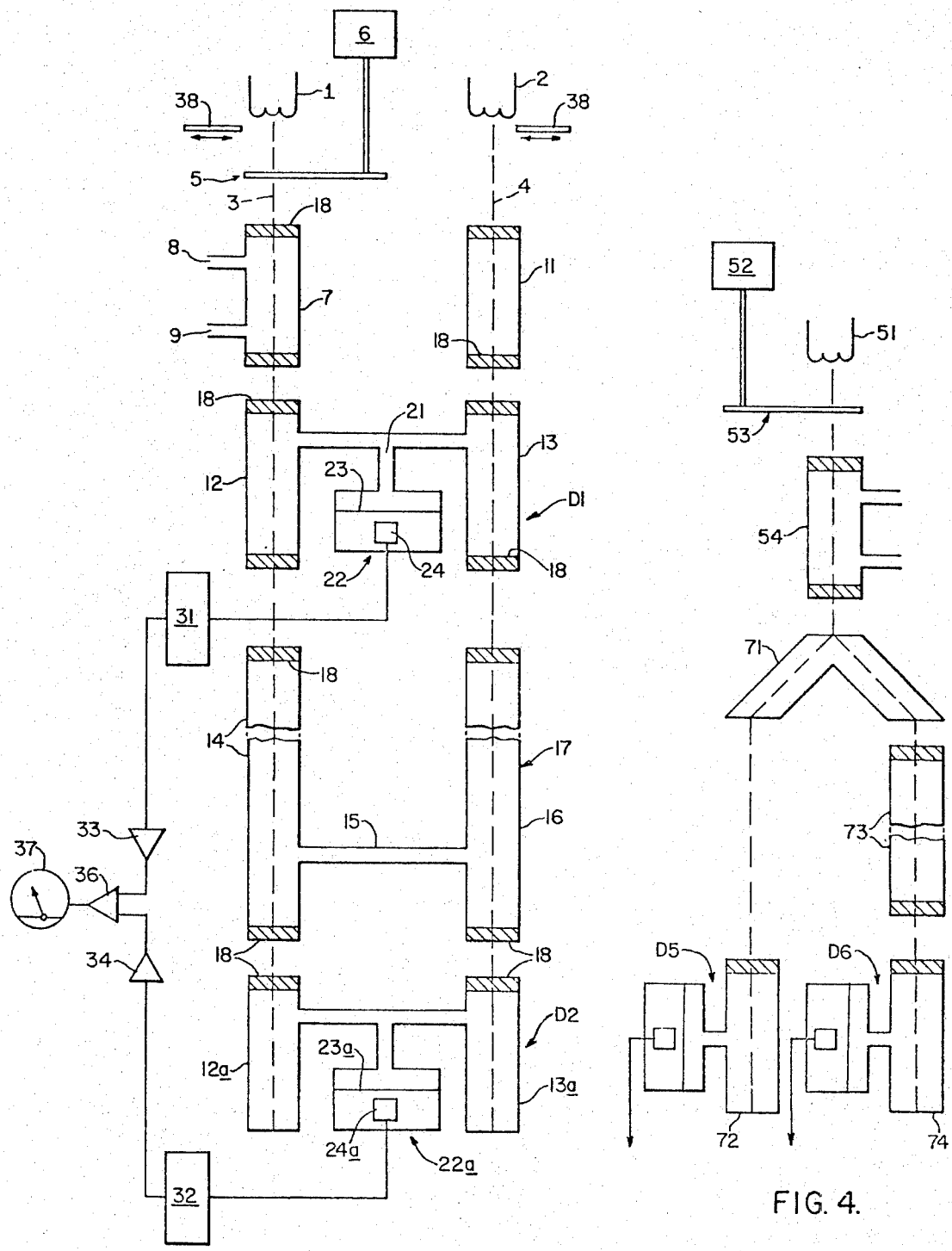
FIG. 4 shows a modified form of the invention illustrated in FIG. 3.

In FIG. 1, the analyzer is of the double beam, non-dispersive type for measuring, as an illustrative example, the concentration of carbon monoxide in air containing water vapor as an interferent. Water vapor has an absorption band that overlaps that of carbon monoxide in a spectral region where neither compound is strongly absorptive. The device includes a source of infrared energy, shown here as two substantially identical, side-by-side sources 1 and 2, although they could be combined into a single source and then split, for transmitting their energy along two beam paths. One of the beams, herein called the analytic beam, is composed of rays from source 1 extending parallel to an optical axis 3 (shown in dashed lines). The other, herein called the reference beam, consists of rays from source 2 and extends parallel to an optical axis 4. Both beams pass through a chopper region, where they are alternately interrupted by a shutter device 5, in the form of a semicircular opaque disc rotated by an electric motor 6.

The resulting alternately pulsed analytic and reference beams pass, respectively, through a sample cell 7, which is provided with a gas inlet 8 and a gas outlet 9, and a reference cell 11. The two beams then pass through a first detector unit D1, the analytic beam going through an absorption chamber 12 therein and the reference beam through a similar chamber 13. Next, the two beams pass, respectively, through absorption chambers 14 and 16 (interconnected by a passage 15) of a filter unit 17 and, finally, through absorption chambers 12a and 13a of a second detector unit D2. Each of the absorption chambers in the detector and filter units are identical in physical structure with the other chamber in the same unit; and they are provided, as are the sample and reference cells, with infrared-transparent windows 18 at one or both of their ends to permit passage of infrared energy without attenuation.

Each detector unit D1 and D2 includes, besides its two absorption chambers, a T-shaped passage 21 or 21a connecting those chambers with each other and with a pressure responsive condenser microphone 22 or 22a. Each of the latter has the usual flexible diaphragm 23 or 23a and stator 24 or 24a mechanically disposed in the same way, for example, so that an increase in pressure in the chambers tends to flex the diaphragm towards its adjacent stator. So far as practicable, the elements of each detector are mechanically and structurally identical with the corresponding elements in the other detector, as indicated in FIG. 1 by the use of the same numeral, with or without the subscript a, to identify the same element. In addition, the two detectors should be similarly oriented to have identical response to vibration.

In context of the illustrative example referred to, detector D1 may be filled with a mixture of carbon monoxide and a non-absorbing diluent gas, such as argon, the carbon monoxide being present in sufficient concentration to absorb infrared energy in the same spectral region as the carbon monoxide in the sample cell. Stated another way, there should be enough carbon monoxide in Detector D1 to absorb an amount of infrared energy from the analytic beam (in the absence of an absorbing gas in the sample cell) equivalent to the energy absorbed from that beam by carbon monoxide in the sample cell when actually testing a sample gas. Practically, the carbon monoxide concentration in detector D1 should be somewhat higher, based on its maximum expected concentration in the sample gas. Detector D2 may be filled with a smiliar mixture, but with a higher concentration of carbon monoxide to "pressure broaden" or enlarge its absorption band to include an adjacent spectral region in which the interferent, water vapor, is more strongly absorbent than in the region where it overlaps the absorption band of the carbon monoxide in the sample cell.

Referring generally to the operation of the analyzer of FIG. 1, the two beams of infrared energy are transmitted along the sample and reference paths through the sample and reference cells to the absorption chambers of the detector units. Before entering the sample and reference cells, the beams are alternately modulated by the rotary chopper 5, such that in one portion of each cycle the reference beam is cut off while the sample beam is not, and in another non-consecutive portion of the cycle, the sample beam is cut off while the reference beam is not. These non-consecutive portions are separated by an intervening cycle portion in which both beams are partially cut off at the same time. As a result of such modulation, pulses of infrared energy at the chopping frequency pass alternately along each beam path, separated by intervals in which some infrared energy passes along both paths. If both beams have the same effective cross section, the total energy entering the sample and reference cells remains constant. If the pulses reaching detector D1 contain energy in those wavelengths that are absorbed by the gas in the detector, the gas therein will be heated and tend to expand and then contract in accordance with the gas laws. If each absorption chamber 12 and 13 alternately receives the same amount of energy, the alternate gas expansions (and contractions) in each of those chambers will be equal and complementary, resulting in no overall pressure changes in the detector and, therefore, in no movement of diaphragm 23 of condenser microphone 22. This condition will prevail, for example, when both sample cell 7 and reference cell 11 contain a non-absorbent gas and when the beams entering those cells contain equal amounts of infrared energy.

In contrast, when the gas in sample cell (but not in the reference cell) contains the component of interest (or an interferent) that absorbs infrared energy, the analytic beam alone is attenuated before entering the detector unit. The gas in chamber 12 (in the optical path of the analytic beam) will then receive and absorb in a given cycle less infrared energy than will the gas in chamber 13 (in the optical path of the reference beam). As a result, the alternate gas expansions (and contractions) in the two chambers will be unequal, producing pressure pulses that actuate the microphone diaphragm. It is obvious that the second detector D2 operates in a similar way according to the same principles.

The pressure pulses in each detector unit reflect different absorptions therein of the two beams and are measured as variations in the electrical capacity of its condenser microphone. Both microphones are connected, as shown in FIG. 1, in an electronic circuit that includes transducers 31 and 32, having identical electrical characteristics and capable of transforming capacitative variations into voltage signals, two variable gain amplifiers 33 and 34, a differential amplifier 36, and a meter 37.

To calibrate and compensate the device for measuring trace amounts of carbon monoxide, e.g., up to 50 PPM in air containing more or less water vapor, and under mobile conditions where vibration can be expected (as in a typical field analysis for air pollution), the concentration of carbon monoxide in detector D1, may be around 4 percent and in detector D2 around 20 percent, the balance argon in each case. Initially, the absorption chambers of filter 17 may be entirely filled with carbon monoxide, essentially blocking out all infrared absorption in detector D2. Next, the optical system is balanced by putting a non-absorbing gas in the sample and reference cells and then adjusting the infrared energies of the analytic and reference beams, for example, by adjusting trimmers 38 positioned in the paths of those beams until meter 37 reads zero. Then, the range of the meter is adjusted by filling the sample cell with a non-absorbing gas containing carbon monoxide at a concentration of 50 PPM (its maximum expected concentration in the atmospheric sample to be later tested) and adjusting the gain of amplifier 33, which amplifies the output signal of detector D1, to obtain a full scale reading on the meter.

To compensate for mechanical vibration sample cell 7 is now filled with a non-absorbing gas, and the optical system is subjected to the vibration conditions found in actual service. The gain of amplifier 34, which amplifies the output signal of detector D2, is then adjusted until the meter shows a null reading. This adjustment does not affect in any way the amplified output signal of detector D1 or the response of the meter thereto.

Figure 2:
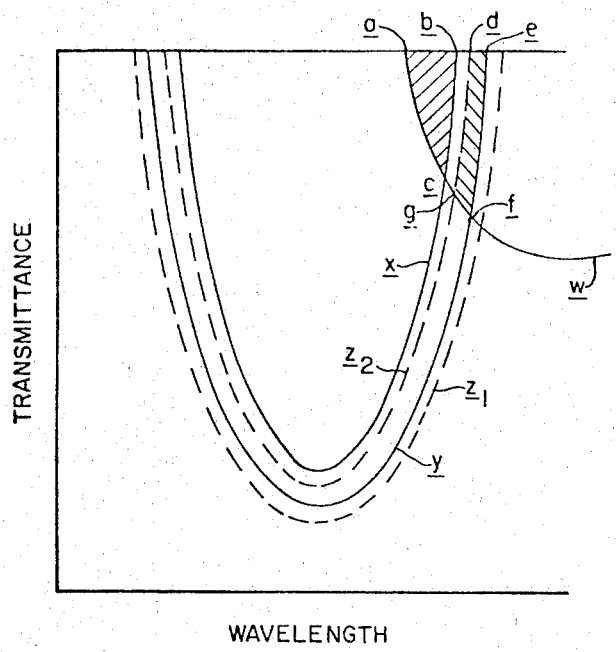
FIG. 2 shows several illustrative curves representing the absorptive properties of carbon monoxide at various concentrations in a non-absorptive gas, and also a curve representing the absorptive characteristics of water vapor.

The next step is to compensate for water vapor expected to be present in the sample atmosphere. This is done by adding water vapor to a non-absorbing gas in the sample cell and then reducing the concentration of carbon monoxide in filter unit 17 until the meter gives a null reading. In explanation of this procedure, FIG. 2 shows, although only approximately and somewhat exaggerated for clarity, simplified infrared absorption curves of carbon monoxide at various concentrations and of water vapor, as follows: $x$ represents the absorption curve of carbon monoxide at the maximum concentration expected in the sample gas (which is also the desirable absorption curve of the carbon monoxide in detector D1); $y$ represents the absorption curve of carbon monoxide in detector D2; $z_1$ represents the absorption curve of carbon monoxide at the 100 percent concentration initially present in filter 17 and $z_2$ at its adjusted concentration that compensates for water vapor; and $w$ represents the absorption curve of water vapor at its maximum expected concentration in the sample gas (which, for the widest practical application, may be assumed to be 100 percent). It is apparent from these curves (1) that the absorption band of carbon monoxide, at the concentration indicated by curve $x$, overlaps that of water vapor in the spectral region $abc$ where both compounds are only weakly absorptive and (2) that, as the carbon monoxide concentration increases and its absorption band expands to increase the area of such overlap, water vapor becomes more strongly absorptive in each successive increment of this increasing area.

In the absence of an absorbing gas in the sample and reference cells, the carbon monoxide in both chambers of detector D1 absorb infrared energy over the entire spectral region bounded by curve $x$. When water vapor is added to the sample cell, it absorbs energy in the analytic beam over the spectral region $abc$ to cause a corresponding attenuation of the analytic beam entering chamber 12 of detector D1. Since there is no corresponding attenuation of the reference beam entering chamber 13, pressure pulses will occur in detector D1 and produce an output signal. There will be no output signal, however, from detector D2 so long as the concentration of carbon monoxide in filter 17 is high enough to absorb energy in the spectral region extending beyond curve $y$, which defines the outer limit of the absorption band of the carbon monoxide in detector D2. But, when the concentration of carbon monoxide in filter 17 is reduced, for example, to the point where its absorption band is bounded by curve $z_2$ instead of $z_1$, then detector D2 in turn becomes sensitive to water vapor, because the energy in the analytic beam that would otherwise be absorbed in chamber 12a over the spectral region $defg$ (the overlap of curves $w$ and $y$ outside of curve $z_2$) will have already been absorbed by the water vapor in the sample cell. Since there is no corresponding attenuation of the reference beam entering chamber 13a, detector D2 will also produce an output signal. It will be noted in FIG. 2, that neither detector D1 nor detector D2 absorbs infrared energy in the spectral region between curves $x$ and $z_2$, thereby producing a greater discrimination ratio to carbon monoxide between the two detectors as the absorption band in the sample cell approaches that defined by curve $x$. By adjusting the concentration of the carbon monoxide in filter 17, the spectral area $defg$ can be made substantially equal to the spectral area $abc$, so that the output signals of detectors D1 and D2 are thereby made equal and cancel each other as shown by a null reading on the meter.

Once the proper concentration of carbon monoxide in the filter has been determined in the foregoing manner, its absorption chambers are sealed, and the instrument is ready for use. It will be noted that these absorption chambers are shown in the drawing as having a greater length than the absorption chambers of the detector units. The latter are desirably as short as possible to avoid dynamic gas mass effects on the response of the condenser microphones. Since the gas in the filter unit performs no dynamic function, its chambers can be as long as desired to facilitate more precise adjustment of the carbon monoxide therein to compensate for interferent absorption in the sample gas. Similarly, if the concentration of carbon monoxide in the sample gas is high (for example, high enough to absorb 10 percent of the available energy), its absorption in the sample cell can be decreased by shortening the length of that cell and thereby retaining linear response of the instrument to carbon monoxide concentration.

Although optical trimmers (mechanically coupled to provide the same attenuation in both beams) could be substituted for the filter unit 17, the latter provides numerous advantages. As already noted, a filter permits more precise and balanced attenuation, as well as better discrimination. Moreover, an optical trimmer (but not a filter) reflects scattered infrared rays leaving the first detector back into that detector to augment its response. Again, there is no spectral discrimination in the mechanical attenuator, hence no separation of the spectral regions bounded by curves $x$ and $y$, as compared to such separation (defined by region between curves $x$ and $z_2$) due to a filter absorbing energy in the spectral region defined by curve $z_2$.

The device of Fig. 1 compensates automatically for other changes in ambient conditions affecting its absorptive response. Such changes include, for example, variations in the intensity of the infrared source (or equal changes in intensity where there are two sources) and change in ambient pressure and temperature. These changes affect each detector in the same way and therefore produce equal changes in their output signals, which cancel each other.

Figure 3:
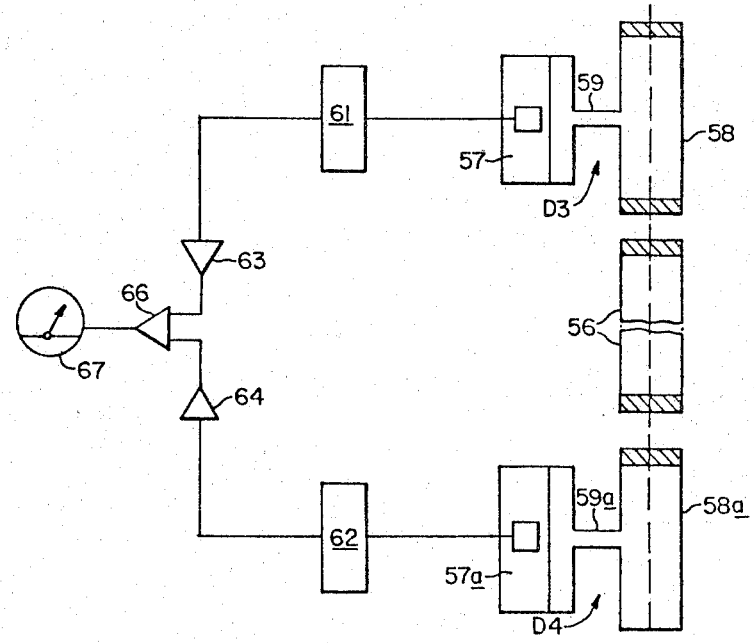
FIG. 3 represents a view, similar to that of FIG. 1, of a modified form of the invention, limited to a single beam of infrared energy.

A modified form of the invention, using only a single beam, is shown in FIG. 3. It compensates for vibration and for those ambient changes affecting absorption that have been referred to in the preceding paragraph; but it does not compensate for cross sensitivity to an interferent gas.

The device of FIG. 3 includes a source of infrared energy 51, a motor 52 for rotating a shutter 53 (similar to shutter 5 of FIG. 1), a sample cell 54, a first detector unit D3 containing a fluid absorbing infrared energy in the same spectral region as the component of interest, a filter unit 56 containing a reference fluid that absorbs infrared energy in a different spectral region, and a second detector unit D4 containing the same reference fluid. The detector units have a pressure sensitive condenser microphone 57 or 57a communicating with a single adjacent absorption chamber 58 or 58a through a passage 59 or 59a. The detector units are physically identical and are oriented the same way. The electronic system is similar to that of FIG. 1 and includes transducers 61 and 62, variable gain amplifiers 63 and 64, a differential amplifier 66, and a meter 67.

A typical analysis suited to this instrument is also carbon monoxide in air, where the moisture content is low or where the error introduced thereby is not important. Where the sample gas contains around 50 PPM of carbon monoxide, detector D3 may contain a 4 percent concentration of the same gas in argon and detector D4 a similar concentration of nitrous oxide in argon. The absorption bands of carbon monoxide and nitrous oxide do not overlap, and the latter compound is the more strongly absorptive. To zero the instrument, amplifiers 63 and 64 are adjusted to have equal gain according to electrical check, and a non-absorbing gas is put in both the sample cell and the filter unit. Then the gas in the latter unit is partially replaced by nitrous oxide until the meter gives a zero reading, indicating that the energy absorption in the two detectors is the same in the absence of an absorbing gas in the sample cell. Next, the meter is calibrated for carbon monoxide sensitivity by filling the sample cell with 50 PPM of carbon monoxide in a non-absorbing gas and the gain of both amplifiers identically adjusted until a full scale reading is indicated on the meter. Compensation for mechanical vibration is obtained by subjecting the optical system to the vibration conditions expected in actual service and by adjusting the gain of amplifier 64 alone to produce a null reading on the meter in the absence of an absorbing gas in the sample cell. The zeroing and calibrating steps may now be repeated, except that the relative gain of the amplifiers 63 and 64 is not changed. The instrument is now ready for use in actual service, having been compensated for various ambient conditions (other than the presence of an interferent in the sample gas) that affect its absorptive or mechanical function.

The apparatus of FIG. 3 may also have its detector units arranged in optical parallel relationship, as shown in FIG. 4. Here, the beam leaving the sample cell 54 is divided in a beam splitter 71 into two beams. One beam passes through the absorption chamber 72 of a first detector D5, and the other through a filter 73 and then through absorption chamber 74 of a second detector D6. The two detectors and the filter are identical with those previously described in connection with FIG. 3 and are filled with the same fluid and oriented in the same way. The signal output of each detector may be measured by an electronic circuit (not shown) identical to that shown in FIG. 3. The device of FIG. 4 operates, and is calibrated, in the same way as that of FIG. 3. In each case, the first and second detectors absorb energy in different spectral regions, and it is therefore immaterial whether they are disposed in series or in parallel relation. The same is true of the detector units of FIG. 1, which could be arranged in parallel rather than in series; but this would require at least one additional infrared energy beam.

I claim:

1. In an infrared analyzer for measuring a component in a sample fluid mixture in the presence of an interferent having an absorption band overlapping that of the component, the combination including means for emitting beams of infrared energy along two beam paths, one an analytic beam and the other a reference beam, means for alternately interrupting said beams, a sample cell containing the sample fluid to be analyzed in the path of the analytic beam, a reference cell containing a reference fluid in the path of the reference beam, two infrared absorptive detectors of substantially identical physical structure and orientation in optical series relation to each other, each detector having two interconnected absorption chambers respectively positioned in the two paths and being adapted to produce an output signal as a function of the difference in the energies absorbed in the two chambers, the chambers of the first detector containing a substance absorbing infrared energy in the same spectral region as the component in the sample cell, said region being one in which both the component and the interferent are weakly absorptive, and giving a first electrical signal response to variations of both the component and the interferent, the chambers of the second detector containing a substance absorptive in an adjacent spectral region where the sample fluid is absorptive due to the presence of the interferent alone and giving a second electrical signal responsive to variations in the interferent, attenuating means interposed in the optical paths of both beams between the two detectors for equally attenuating the energy in each of said beams to limit the signal response of the second detector to an amount that compensates for so much of the signal response of the first detector as is due to the presence of the interferent in the fluid sample, first and second amplifying means for amplifying the signal output of the first and second detectors respectively, means for independently adjusting the gain of each of said amplifying means, and differential amplifying means for producing a net output signal as a function of the difference in the amplified signals from the detectors.

2. Apparatus according to claim 1, in which each detector includes a separate condenser microphone having a diaphragm side and stator side and in which pressure pulses produced by energy absorption in the detector are applied to the same side of each microphone.

3. Apparatus according to claim 2, in which the attenuating means includes filter means adapted to contain a substance absorptive in said adjacent spectral region.

4. Apparatus according to claim 2, in which the absorptive substance in the chambers of the two detectors is of the same composition as the component, the amount of said substance in the first detector in the optical path of the analytic beam being greater than that in the sample cell but substantially less than that in the second detector in the optical path of the same beam.

5. Apparatus according to claim 4, in which the absorptive substance in the filter means is the same composition as the component.

6. Apparatus according to claim 5, in which the component is carbon monoxide and the interferent is water vapor.

7. Apparatus according to claim 1, in which the attenuating means between the two detectors includes filter means for limiting the infrared energy in the beams entering the second detector to a spectral region adjacent to but spaced from the spectral region in which infrared energy is absorbed in the first detector.

8. The method of adjusting an infrared analyzer having a source of infrared energy producing two beams, means for alternately modulating the two beams and means for optically attenuating at least one of them, a sample cell in one beam path for holding a sample fluid containing a component of interest and an interferent, a reference cell containing a reference fluid in the other beam path, a first detector unit and a filter unit and a second detector unit in optical series relation and each provided with two chambers for holding a mixture of absorbing and non-absorbing fluids in the beam paths, all of the foregoing elements except the filter unit constituting the optical system of the apparatus, the detectors having pressure responsive means connected to an electric circuit that includes first amplifying means connected to the first detector unit and second amplifying means connected to the second detector unit and differential amplifying means for amplifying the difference between the amplified outputs of the detectors to produce a net output signal, said method including the following steps: (1) with the second detector receiving no infrared energy from the source, (a) attenuating one of the beams until the net output signal is zero in the absence of an absorbing fluid in the sample cell, and (b) with a known concentration of the component in a mixture of the component and a non-absorbing fluid in the sample cell, adjusting the gain of the first amplifying means until the net output signal is at a predetermined level corresponding to said component concentration, and (c) with a non-absorbing fluid in the sample cell and with said optical system subjected to vibration, adjusting the gain of the second amplifying means until the net output signal is zero; and (2) with both detectors receiving infrared energy from said source and with a mixture of the interferent and a non-absorbing fluid in the sample cell, adjusting the concentration of the absorbing fluid in the filter unit until the net output signal is zero.

* * * * *